United States Patent [19]

Pierce, III et al.

[11] 3,735,734
[45] May 29, 1973

[54] ODOR SUPPRESSING LITTER MATERIAL

[75] Inventors: Albert R. Pierce, III, Franklin Lakes; David Rodriguez, Fort Lee, both of N.J.

[73] Assignee: Thomas J. Lipton Inc., Englewood Cliffs, N.J.

[22] Filed: Dec. 15, 1970

[21] Appl. No.: 98,474

[52] U.S. Cl. ..................................................119/1
[51] Int. Cl. ...........................A01k 29/00, A01k 1/00
[58] Field of Search ......................252/431 N, 431 C, 252/437, 430; 119/1

[56] References Cited

UNITED STATES PATENTS

| | | | |
|---|---|---|---|
| 2,347,955 | 5/1944 | Korpi | 252/437 X |
| 1,790,272 | 1/1931 | Leasman | 252/437 X |
| 2,501,042 | 3/1950 | Gear | 252/437 X |
| 2,517,720 | 8/1950 | Schaad | 252/437 X |
| 3,286,691 | 1/1966 | McFadden | 119/1 |
| 3,425,397 | 2/1969 | Schulein et al. | 119/1 |
| 2,279,405 | 4/1942 | Laughlin | 119/1 |
| 2,351,686 | 6/1944 | Kohl | 119/1 X |
| 2,895,873 | 7/1959 | Sawyer et al. | 119/1 |
| 2,708,418 | 5/1955 | Sugarman et al. | 119/1 |
| 3,059,615 | 10/1962 | Kuceski et al. | 119/1 |

*Primary Examiner*—Patrick P. Garvin
*Attorney*—Brumbaugh, Graves, Donohue & Raymond

[57] ABSTRACT

An odor suppressing litter material for domestic animals is an admixture of an absorbent soil and an odor inhibiting additive. The soil is clay or diatomaceous earth and may be a form of clay known as Fuller's earth. The deodorizing additive is chlorophyl, sodium dihydrogen phosphate, potassium dihydrogen phosphate, potassium acid phthalate, or a combination of these. The deodorizing additive content is between 0.01 and 10.0 percent by weight of the admixture.

4 Claims, No Drawings

ODOR SUPPRESSING LITTER MATERIAL

BACKGROUND OF THE INVENTION

The present invention relates to a new and improved animal litter material, and more particularly an animal litter material having improved odor suppressing characteristics and a method of making this litter material.

A large number of substances are commonly employed as litter materials for animals. They include various types of soil, parts of various plants such as straw, sorghum, corn cob, sugar cane stalks, peanut hulls, and cotton seed hulls. Other miscellaneous materials such as wood chips, paper, and sawdust have been employed with some degree of success. Although some of these materials have been found to perform acceptably when used on farms or in kennels, their performance is often less than satisfactory when used in connection with domestic animals such as cats and dogs in a house or an apartment.

Conventional materials are somewhat objectionable in that they fail to suppress, to the desired extent, odors caused by liquid waste materials. These odors are produced as the pH level of the liquids absorbed by the litter material changes from acidic to basic giving off odoriferous substances, primarily ammonia. Another objection to many commonly used litter materials is that they are too light and insufficiently cohesive causing them to be tracked or kicked out of the container by the animal. Other materials are undesirable because they have a high dust content.

Another important consideration in the selection of a litter material is that the animal should, preferably, have a natural affinity for it. It has been found that a household cat will use a litter material without having to be trained to do so if the material is conducive to digging by the animal and is otherwise pleasing to it.

Thus, there is a recognized need for an animal litter material for use by domestic animals in houses and apartments which has improved odor suppressing characteristics and is, at the same time, desirable from other points of view.

SUMMARY OF THE INVENTION

The present invention consists of an animal litter material having improved odor suppressing characteristics and a method of making this litter material. The material comprises an admixture of an absorbent soil and an odor inhibiting additive. The soil is selected from the group consisting of clay and diatomaceous earth. The odor inhibiting additive is selected from the group consisting of chlorophyl, sodium dihydrogen phosphate, potassium dihydrogen phosphate, and potassium acid phthalate. The deodorizing additive content is between 0.01 and 10.0 percent by weight of the admixture. The presence of this odor inhibiting additive causes the tendency of animal waste products deposited in the admixture to give off odoriferous substances to be greatly reduced. The preferred odor inhibiting additive is chlorophyl, used either alone or in combination with other additives such as sodium dihydrogen phosphate.

The odor inhibiting additive may be added directly to the principal component of the litter material, or it may first be applied to a granular carrier such as corn cob and then mixed with the clay or diatomaceous earth. The chlorophyl turns the litter material green but, as the chlorophyl is absorbed into the material, the green color is gradually lightened and it may eventually disappear. In order to stabilize the color of the material so that it does not give the false impression that the chlorophyl has been exhausted and so that the material retains a dark color which tends to mask solid waste, it is desirable to add a green dye to the soil.

The odor inhibiting additive or additives should be present in an amount between 0.01 and 10.0 percent by weight of the admixture. The best results are obtained when this percentage lies between 0.5 and 2.0. Generally, the optimum percentage is about 1 percent.

The addition to the litter material of the odor inhibiting additives mentioned above may, of course, be viewed as a method of increasing the odor suppressing characteristics of a litter material. In the case of chlorophyl, the additive may be supplied in liquid or powder form. The liquid form is preferred because powder tends to settle to the bottom of the container. Liquid chlorophyl may be sprayed on the surface of clay or diatomaceous earth, and the soil is then thoroughly mixed. Another way of adding the chlorophyl which facilitates mixing and improves quality control is to coat a granular carrier such as corn cob with liquid chlorophyl. The coated carrier is then mixed with the soil. Of course, this method of improving the odor suppressing characteristics may be used in connection with litter materials other than clay and diatomaceous earth.

DESCRIPTION OF THE PREFERRED EMBODIMENTS

In accordance with the present invention, an odor suppressing litter material for domestic animals comprises an admixture of an absorbent soil and an odor inhibiting additive. The soil, which makes up at least 90 percent of the admixture and hence may be referred to as the principal component of the material, is preferably either clay or diatomaceous earth. One suitable type of clay is commonly known as Fuller's earth.

The preferred principal components are selected on the basis of a number of characteristics. They are readily and inexpensively available, they are not flamable, and they have the ability to absorb relatively large quantities of liquids in proportion to their weight and volume. Another important characteristic of these materials is their density. It has been found that many known litter materials such as grass, peanut hulls, and sawdust are too light and are easily kicked out of an animal commode or tracked about the premises by the animal. Another important feature of the preferred soils is that, because of their weight and texture, household cats find them suitable for digging and will use the material for its intended purpose without having to be trained to do so. The preferred soils are sufficiently cohesive that they are not easily spilled or scattered as is, for instance, sand. In addition, they have a low dust content.

An important characteristic of clay and diatomaceous earth is that both of these substances are compatible with the additives which are included in the litter material to suppress odor. They are also capable of accepting a dye which stabilizes the color of the material and tends to mask solid wastes.

The preferred odor inhibiting additive is chlorophyl, the following types of which have been found to be suitable: copper chlorophyllin, potassium sodium copper chlorophyllin, chlorophyl copper complex, and sodium magnesium chlorophyllin. Each of these types may be liquid, granular, or powdered. A liquid is preferred because it is more economically available and because powder tends to settle to the bottom of the container. Whether used as a liquid or a powder, the preferred type of chlorophyl is chlorophyl copper complex.

Another odor inhibiting additive — which may be advantageously employed in combination with chlorophyl — is sodium phosphate monobasic. The 1, 2, 7, and 12 hydrated forms are suitable, but the preferred form is anhydrous sodium dihydrogen phosphate. Potassium phosphate monobasic, also known as potassium dihydrogen phosphate and Sorensen's potassium phosphate, has been found to be a suitable odor inhibiting additive. Another useful additive is potassium acid phthalate.

Whatever odor inhibiting additive or combination of additives is chosen, it should be present in an amount between 0.01 and 10.0 percent by weight of the admixture. Generally, the best results are obtained when the odor inhibiting additive content falls between 0.5 and 2 percent. The most desirable and optimum percentage is generally about 1 percent.

The addition of chlorophyl tends to change the color of clay or diatomaceous earth from a fairly light gray to green. Over a period of time, however, the chlorophyl is absorbed into the soil and the green coloring is lightened and may eventually disappear. This creates the false impression that the chlorophyl has evaporated or has been exhausted and that the litter material has lost its odor suppressing capability. Another undesirable result of the lightening of the color of the litter material is that the litter material loses its ability to camouflage solid waste. For this reason it is desirable to add a dye which tends to keep the material green.

Chlorophyl may be added to the soil by spraying it on the surface of the soil in liquid form and then mixing the soil so that the chlorophyl becomes distributed throughout. This method of improving the odor inhibiting characteristics of a litter material may, of course, be used in connection with many types of soil, although clay and diatomaceous earth are preferred for the reasons stated above. The chlorophyl may be mixed more uniformly throughout the soil and quality control may be improved by spraying the additive onto a granulated carrier such as corn cob to coat the carrier and then mixing the carrier with the principal component of the admixture.

It will be obvious to those skilled in the art that the above-described embodiment is meant to be merely exemplary and that it is susceptible of modification and variation without departing from the spirit and scope of the invention. Moreover, although it has been disclosed primarily for use by household cats and dogs, it is also useful in connection with birds and other pets as well as some barnyard animals. Therefore, the invention is not deemed to be limited except as defined by the appended claims.

We claim:

1. A method for improving absorbent soil used as a litter material for domestic animals comprising adding to an absorbent soil selected from the group consisting of clay and diatomaceous clay a synthetic chlorophyl compound selected from the group consisting of copper chlorophyllin, potassium sodium copper chlorophyllin, chlorophyl copper complex and sodium magnesium chlorophyllin and an odor inhibiting additive selected from the group consisting of sodium dihydrogen phosphate, potassium dihydrogen phosphate and potassium acid phthalate; said synthetic chlorophyl compound and said odor inhibiting additive being in an amount between 0.01 and 10.0 percent by weight.

2. The method as set forth in claim 1 wherein said chlorophyl is added in an amount equal to about one percent by weight of the mixture thus formed.

3. The method as set forth in claim 1 wherein said chlorophyl is sprayed, in liquid form, onto the surface of said litter material and then mixed throughout said litter material.

4. The method as set forth in claim 1 wherein said chlorophyl is sprayed, in liquid form, onto a granular carrier and said carrier is then mixed into said litter material.

* * * * *